INVENTOR
Leo A. Martini

BY Shley & Shley

ATTORNEYS

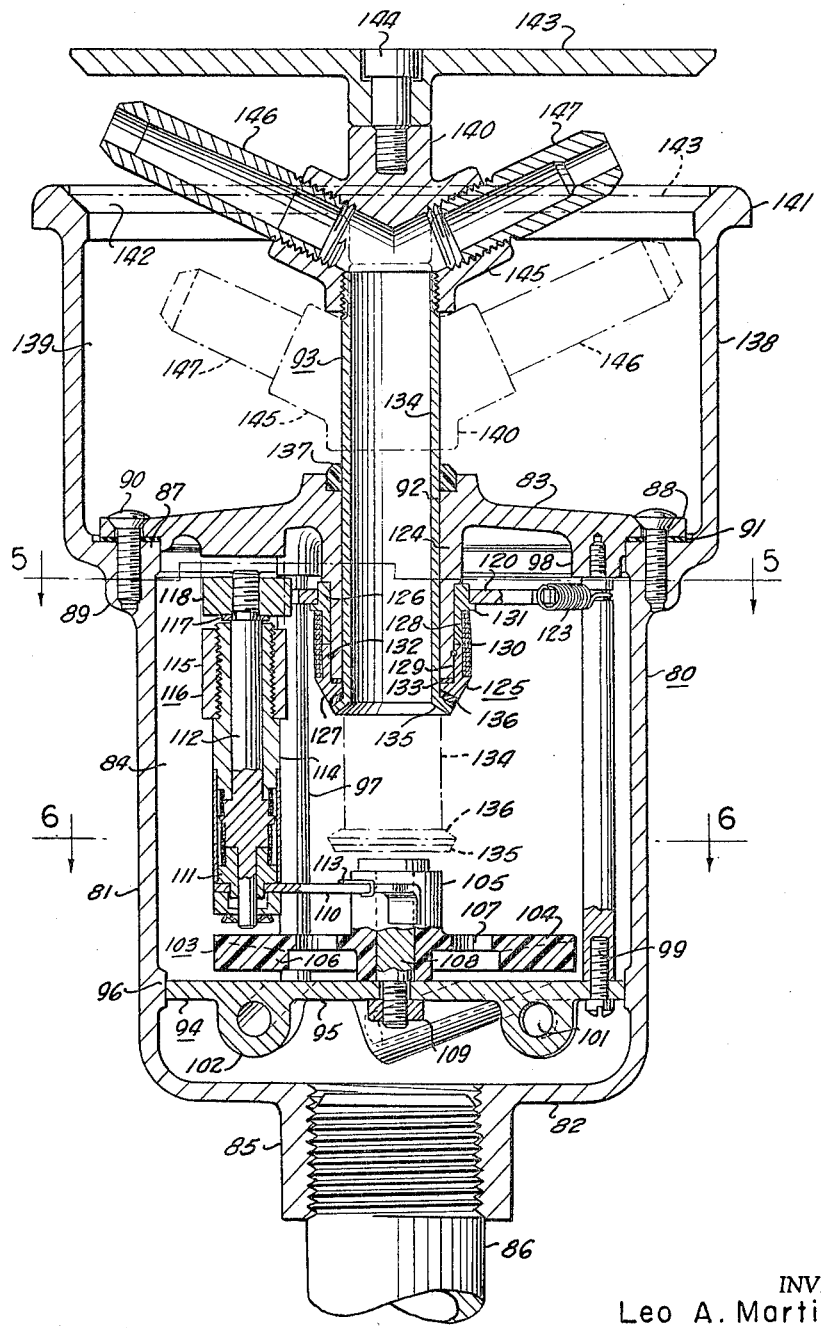
FIG. 4
INVENTOR
Leo A. Martini
BY 
ATTORNEYS

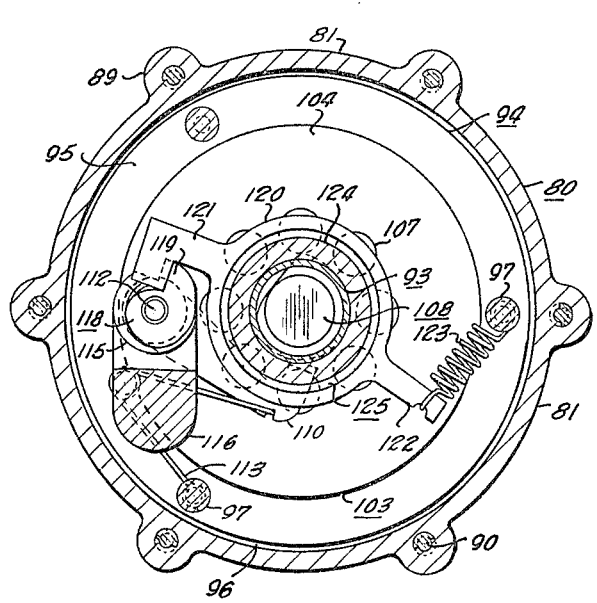

United States Patent Office 3,266,730
Patented August 16, 1966

3,266,730
TORQUE TRANSMISSION UNITS FOR POP-UP
SPRINKLERS
Leo A. Martini, Dallas, Tex., assignor to Telsco Industries,
Dallas, Tex., a corporation of Texas
Filed Jan. 20, 1964, Ser. No. 338,662
14 Claims. (Cl. 239—205)

This invention relates to new and useful improvements in torque transmission units.

One object of the invention is to provide a novel torque transmission unit wherein the torque is increased by rotational speed reduction without complex gear assemblies.

Another object of the invention is to provide a novel torque transmission unit having a relatively high to low rotational speed reduction and a relatively low to high torque transmission whereby only a small input of power is required in order to produce an appreciable torque.

A further object of the invention is to provide a novel torque transmission unit having a minimum of parts and particularly high speed parts so as to be of durable, economical and comparatively simple construction.

A particular object of the invention is to provide a novel torque transmission unit having constantly rotating means for imparting intermittent rotation to drive means which includes speed reduction means whereby low speed high torque is obtained from high speed low torque.

Another object of the invention is to provide a novel torque transmission unit, of the character described, wherein unidirectional clutch means connects the drive means to the constantly rotating means to permit the intermittent rotation of said drive means and wherein said constantly rotating means may be a stator-rotor type turbine for actuation by fluid under pressure.

A further object of the invention is to provide a novel torque transmission unit, of the character described, wherein the torque may be increased and the speed reduced by connecting one or more units in a train whereby the input power may be of relatively high speed and low torque.

An important object of the invention is to provide an improved torque transmission unit, of the character described, which is particularly adapted for use in lawn sprinklers having rotating nozzles and other fluid actuated devices due to its high to low speed reduction and low to high torque transmission as well as its durable, economical and relatively simple construction.

A construction designed to carry out the invention will be hereinafter described, together with other features of the invention.

Figure 1:
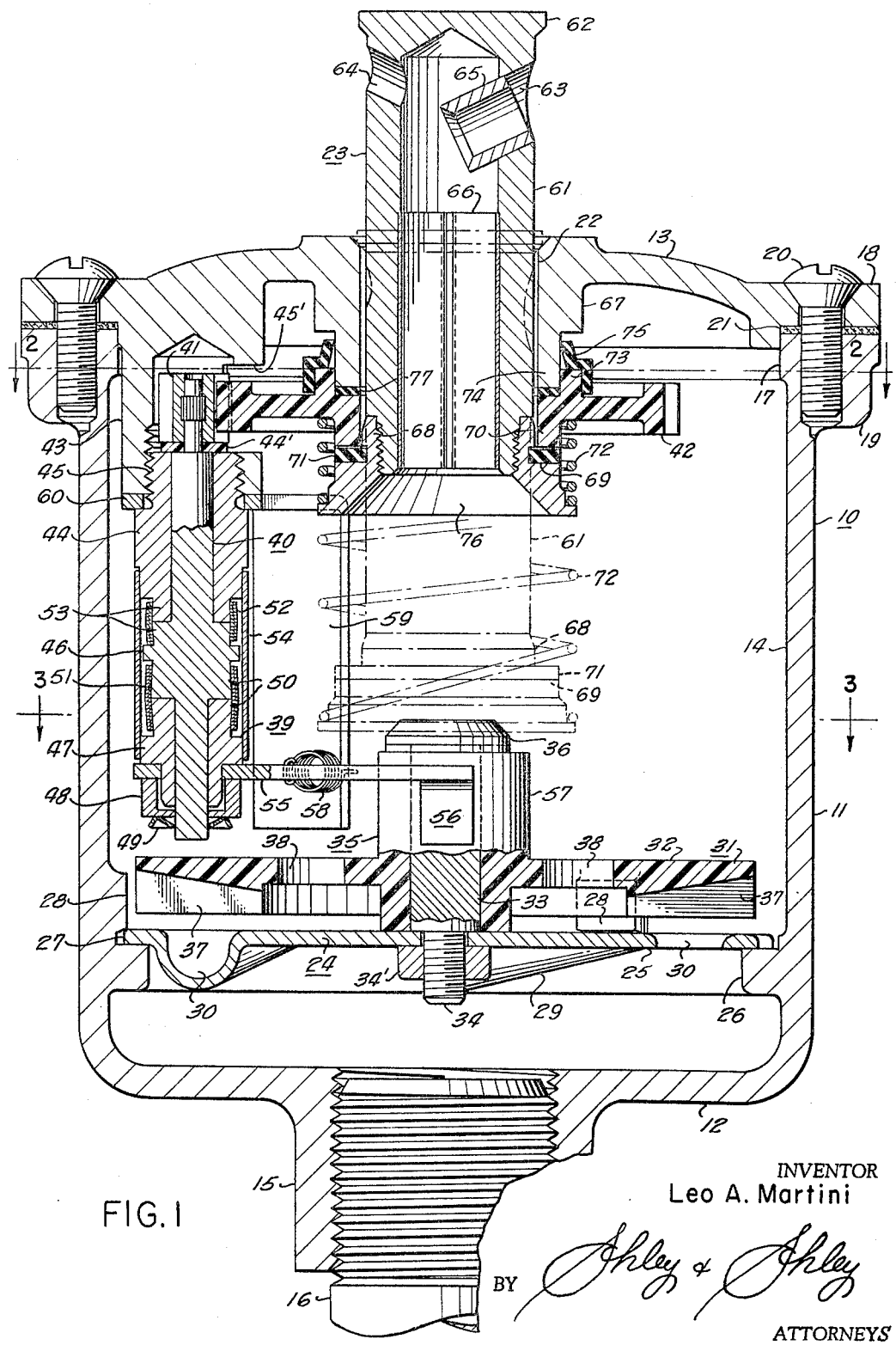
Figure 2:
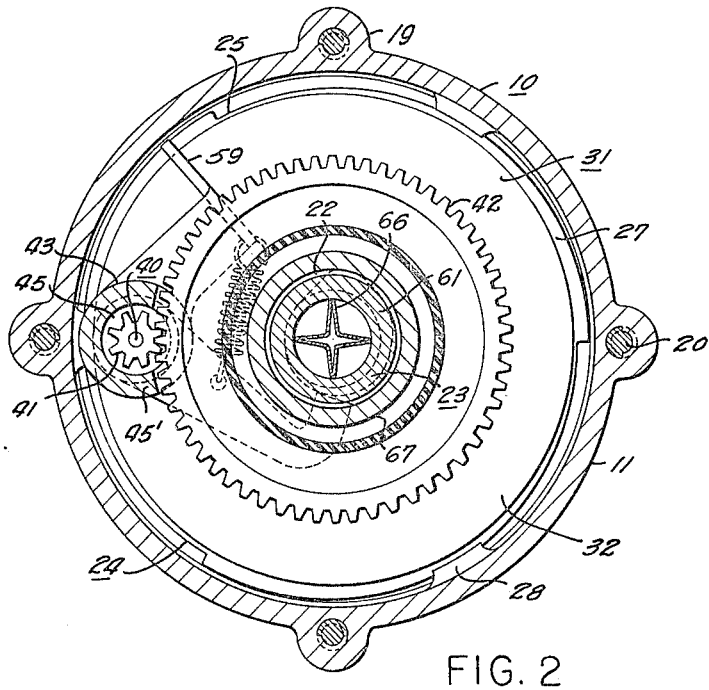
Figure 3:
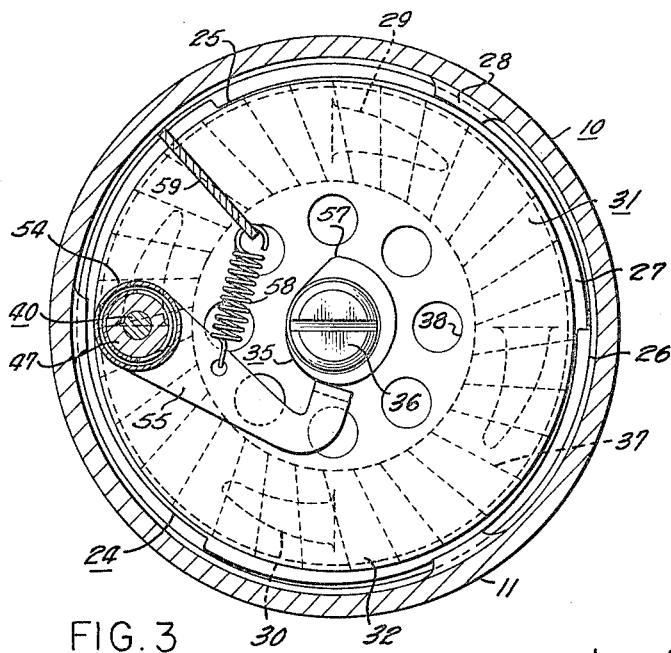

The invention will be more readily understood from a reading of the following specification and by reference to the accompanying drawings wherein examples of the invention are shown, and wherein:

FIG. 1 is a transverse, vertical, sectional view of a lawn sprinkler head having a rotating nozzle and a torque transmission unit constructed in accordance with the invention, the nozzle being shown in operative position in full lines and in inoperative position in broken lines, FIG. 2 is a horizontal, cross-sectional view, taken on the line 2—2 of FIG. 1, FIG. 3 is a horizontal, cross-sectional view, taken on the line 3—3 of FIG. 1, FIG. 4 is a transverse, vertical, sectional view of another lawn sprinkler head having a different type of rotating nozzle and a modified torque transmission unit, the nozzle being shown in operative position in full lines and in inoperative position in broken lines, FIG. 5 is a horizontal, cross-sectional view, taken on the line 5—5 of FIG. 5, and FIG. 6 is a horizontal, cross-sectional view, taken on the line 6—6 of FIG. 4.

In the drawings, the numeral 10 designates the hollow body of a lawn sprinkler head formed by an upright, cyilndrical, side wall 11, an integral, circular, bottom wall 12 and a removable, circular, cover plate or top wall 13 and having a cylindrical chamber 14 of relatively large volume. An axial, internally screwthreaded nipple 15 depends from the bottom wall 12 for receiving the upper end of a water supply pipe 16. The side wall 11 has a radial enlargement or flange 17 at its upper end for supporting the complementary peripheral rim 18 of the cover plate 13, which rim may be angular in cross-section so as to fit within as well as overlie the flange. Bosses 19 may depend from the flange 17 for receiving screws 20 to connect the plate rim 18 to said flange and a sealing gasket 21 may be interposed between said rim and flange. An axial, circular opening 22 extends through the cover plate for rotatably and slidably receiving a rotating nozzle 23 which will be described in more detail hereinafter.

A stator 24 is mounted in the lower portion of the chamber 14 for imparting clockwise rotation to water entering said chamber through the nipple 15 and supply pipe 16 and includes a horizontal, circular plate 25 supported by an internal, radial shoulder 26 on the side wall 11. The stator 24 is confined against movement by having cammed portions 27 on the periphery of its plate 25 for engaging beneath lugs 28 formed on the inner surface of the side wall in overlying, closely-spaced relation to its shoulder 26 (FIGS. 1–3) whereby said stator may be installed and removed by relative rotation and separates the bottom of the chamber from the remainder thereof. As shown by the numeral 29, the stator plate 25 has arcuately-extending, semi-conical portions offset downwardly to provide nozzle-like openings 30 through said plate for receiving the water entering the chamber therebelow and directing said water in clockwise jets thereabove in a circular path about the axis of the stator. A rotor 31, of plastic or other suitable material, overlies the stator 24 and includes a horizontal, circular disk 32 rotatably mounted on the stator plate 25 by an axial shaft 33 having a screwthreaded stud 34 on its lower end depending through said plate for receiving suitable fastening means 34'. The rotor plate 32 has an axial, upstanding cam 35 surrounding the upper portion of the shaft 33 and said shaft has an enlarged, circular, slotted head 36 on its upper end overlying the cam. Radial vanes 37 are formed on the underside of the peripheral portion of the rotor plate in overlying relation to the arcuate, nozzle-like openings 30 of the stator plate whereby the jets of water passing through said openings impinge the vanes and impart clockwise rotation to the rotor 31. From the vanes 37, the water flows upwardly through a ring of apertures 38 in the rotor plate 32 between the cam 35 and said vanes as well as around said plate due to it being of less diameter than the chamber 14.

The stator 24 and rotor 31 coact to provide a turbine for constantly rotating the cam 35 when water under pressure is supplied to the chamber 14 and the rotation of said cam is adapted to impart intermittent rotation to the nozzle 23 through a unidirectional clutch 39 and an upright drive shaft 40 having a pinion 41 fixed on its reduced upper end for meshing with an annular gear 42 which encircles said nozzle and which is of much larger diameter than the pinion. A tubular boss 43 depends from the underside of the cover plate 13 adjacent the side wall 11 for suspending the drive shaft 40 and has the upper end of a tubular bearing 44 for said shaft screwthreaded in the lower end of its bore 45. The boss 43 has a lateral recess 45' in its upper portion communicating with the bore 45 to permit the annular gear 42 to mesh with the pinion 41 which overlies and coacts with the bearing 44 to prevent displacement of the drive shaft. Preferably, an anti-friction washer 44′ is interposed between the pinion and shaft bearing.

The shaft 40 has an enlarged medial portion 46 underlying the bearing 44 and overlying a cylindrical drive hub 47 of the clutch 39 which is rotatably confined on the lower end of said shaft by a bearing 48 and suitable fastener 49. As shown by the numeral 50, the lower end of the enlarged shaft portion 46 and the upper end of the clutch hub 47 are reduced in diameter to provide complementary, annular recesses or clutch faces which coact to support of helical, clockwise wound spring 51. A helical, counterclockwise wound spring 52 surrounds similar recesses or clutch faces 53 formed by reducing the diameters of the upper end of the medial shaft portion and the lower end of the bearing 44. Preferably, the springs 51 and 52 are covered by a cylindrical sleeve 54 extending thereabove and therebelow and carried by the shaft bearing and clutch hub.

Due to the clockwise winding of the spring 51, clockwise oscillation of the clutch hub 47 tightens and contracts said spring into engagement with the clutch faces 50 of said hub and the enlarged medial portion 46 of the drive shaft 40 so as to transmit clockwise rotation to said shaft. Since the spring 52 is wound counterclockwise, it is unwound and expanded by the clockwise rotation of the drive shaft to permit turning of said shaft and its clutch face 53 relative to the bearing 44 and its clutch face 53. The pinion 41 turns with the shaft 40 and drives the annular gear 42 counterclockwise. When the clutch hub is oscillated counterclockwise, the spring 52 is tightened and contracted into engagement with the clutch faces 53 to prevent rotation of the drive shaft relative to the bearing and the spring 51 is unwound and expanded out of tight engagement with the clutch faces 50 to permit turning of said clutch hub relative to said shaft.

For imparting intermittent oscillation to the clutch hub 47, an angular, horizontal arm or element 55 has one end fixedly confined on the reduced lower end of said hub between the bearing 48 and cover sleeve 54. The arm 55 extends laterally from the clutch hub toward the cam 35 and has an upright flange 56 depending from its inner, free end for engagement with the circumferential surface of said cam (FIGS. 1 and 3). A peripheral lobe 57 is formed on the cam for engaging the flange 56 to oscillate the arm clockwise upon each rotation of said cam, and a helical spring 58 has one end attached to said arm for urging it counterclockwise and maintaining said flange engagement with the circumferential surface of said cam as well as urging the clutch hub 47 counterclockwise relative to the drive shaft 40. The opposite end of the spring 58 is connected to the lower portion of an upright, angular bracket 59 which may be suspended from the shaft bearing 44 by having a horizontal portion 60 confined between the upper portion of said bearing and the lower end of the boss 43 (FIG. 1).

The nozzle 23 is adapted to be rotated counterclockwise by the annular gear 42 and includes a cylindrical tube 61 having a closed and enlarged or flanged upper end 62. A pair of diametrically-opposed, upwardly and outwardly inclined outlet orifices or ports 63 and 64 are provided in the tube 61 immediately below its upper end 62 and a range nipple 65 is disposed within and extends inwardly of the larger port 63. Below the ports, the nozzle tube has a conventional vortex breaker 66 extending longitudinally throughout the major portion of its bore. The tube 61 extends slidably and rotatably through the opening 22 of the cover plate 13, which opening is surrounded by an annular boss 67 depending from said plate, and the flanged upper end 62 of said tube is adapted to engage the peripheral margin of said opening to limit relative downward movement of the nozzle. A flanged collar 68 is screwthreaded on the lower end of the nozzle tube below the annular gear and has an external, radial shoulder 69 underlying an annular flange 70 which depends from the inner periphery of said gear and which is adapted to be drivingly connected to the collar by a friction ring 71 interposed between the shoulder and flange. A relatively weak, helical spring 72 is confined on the collar 68 and flange 70 for urging the nozzle 23 downwardly, as shown in broken lines in FIG. 1, as well as for supporting the annular gear 42 by urging it upwardly. The annular gear has an annular, upstanding flange 73, of greater diameter than its depending flange 70, rotatably confined on the reduced lower end 74 of the boss 67 by the force of the spring 72 with said depending flange between said boss lower end and the shoulder 69 of the collar. An annular sealing gasket 75, which is angular in cross-section, surrounds the upstanding flange 73 and boss lower end 74. Preferably, the collar 68 has an enlarged, bevelled mouth 76 and its lower end to prevent sealing engagement with the enlarged head 36 of the shaft 33 when the nozzle 23 is in its lower or closed position. In addition to supporting the annular gear 42, in coaction with the spring 72, and providing a drive connection between the nozzle and said gear, the collar limits the upward movement of said nozzle. An anti-friction, sealing gasket 77 is confined between the lower end of the boss and the flange 70 of the annular gear to seal off therebetween.

The water, flowing around the rotor plate 32 and through its apertures 38, enters the tube 61 of the nozzle through the mouth 76 of the collar 68 and forces said nozzle upwardly to open position as shown in FIG. 1. At the same time, rotation is imparted to the rotor 31 by the jets of water emitted by the arcuate openings 30 of the stator plate 25. The cam 35 turns with the rotor and each revolution thereof oscillates the arm 55 clockwise, due to the engagement of the lobe 57 of said cam with the flange 56 of said arm, so as to oscillate the clutch hub 47 clockwise. This rotation is transmitted to the shaft 40 by the winding of the spring 51 into tight engagement with the clutch face 50 of the clutch hub and the medial portion 46 of said shaft and is permitted by the unwinding of the spring 52 out of tight engagement with the clutch faces 53 of said clutch hub and the bearing 44. Since the pinion 41 turns with the shaft, the annular gear 42 and nozzle 23 are driven counterclockwise. When the cam lobe rides from beneath the arm flange, the spring 58 oscillates the arm and clutch hub counterclockwise so as to expand the spring 51 and contract the spring 52. As has been explained, this permits counterclockwise rotation of the clutch hub 47 relative to the shaft 40 and prevents such rotation of said shaft. Manifestly, a multiplicity of revolutions of the cam 35 is required to impart one full revolution to the clutch hub and shaft and, due to the annular gear being of large diameter relative to the pinion, one full revolution of the nozzle requires a number of revolutions of the shaft.

The torque transmission unit, exemplified by the mechanism of the hereinbefore described lawn sprinkler head, has a relatively high to low rotational speed reduction and a relatively low to high torque transmission so that an appreciable torque is produced by only a small input of power. As a result, the torque transmission unit is particularly adapted for use in operating lawn sprinklers having rotating nozzles and other fluid actuated devices with water or other fluids under relatively low pressures. Although subject to variation, the speed reduction may be approximately 576 to 1. The speed may be further reduced and the torque increased by connecting two or more torque transmission units in a train.

As shown in FIGS. 4-6, a pair of the units may be mounted in the hollow body 80 of a lawn sprinkler head having a lower portion similar to the body 10 and including a similar side wall 81, bottom wall 82, cover plate or top wall 83 and chamber 84. The bottom wall 82 has a similar nipple 85 for receiving a similar water supply pipe 86, the side wall 81 has a similar flange 87 at its upper end for receiving the rim 88 of the plate 83, similar bosses 89 depend from the flange for receiving connecting screws 90, and a similar gasket 91 may be interposed between said flange and rim. A similar opening 92 extends axially through the plate 83 for rotatably and slidably receiving the lower portion of a rotating nozzle 93.

A similar stator 94 is mounted in the lower portion of the chamber 84 and includes a similar plate 95 complementary to and fitting within an internal, annular enlargement or flange 96 on the side wall so as to separate the bottom of said chamber from the major portion thereof. The stator 94 is suspended from the plate 83 by a plurality of posts 97 having their upper ends screwthreaded in bosses 98 depending from said plate and their lower ends fastened to the stator plate 95 by axial screws 99. For imparting clockwise rotation to water entering the chamber through the nipple 85 and supply pipe 86, tangentially-directed openings 100 are formed in the stator plate 95 and communicate with inclined passages 101 extending counterclockwise and tangentially downward through and below said plate. As shown by the numeral 102 in FIG. 4, the passages 101 may be formed by semi-conical, offset portions on the underside of the stator plate. A rotor 103, substantially identical to the rotor 31 and including a similar plate 104 having a similar cam 105, vanes 106 and apertures 107, overlies the stator 94 and is rotatably mounted on the stator plate 95 by a similar shaft 108 and fastener 109. The rotor 103 is of much less diameter than the stator, due to the posts 97, and has its vanes 106 overlying the openings 100 of said stator plate 95 whereby the tangential jets of water discharged by said openings impinge said vanes and drive said rotor clockwise. In addition to flowing through the apertures 107, the water flows upwardly around the rotor and through the chamber 84 to the nozzle 93.

The turbine, provided by the coaction of the stator 94 and rotor 103, rotates the cam 105 clockwise to impart intermittent rotation to the nozzle through an oscillatable arm 110, unidirectional clutch 111 and drive shaft 112. Since the arm 110, clutch 111 and shaft 112 are substantially identical to and function in the same manner as the arm 55, clutch 39 and shaft 40, it is believed unnecessary to describe the same in detail. A V-shaped spring 113 has the outer end of one of its divergent legs bearing against the arm and the outer end of its other leg confied on one of the posts 97 (FIGS. 5 and 6) for urging said arm counterclockwise. The shaft 112 is suspended within the chamber 84 by having its upper bearing 114 screwthreaded in a collar 115 on the lower end of an angular bracket 116 which depends from the cover plate 83 (FIG. 5) and by an annular retainer 117 on the reduced upper end of said shaft overlying the bearing above the collar (FIG. 4).

Instead of the pinion 41, a cam 118 is screwthreaded on the reduced upper end of the drive shaft above the retainer 117 and has a peripheral lobe 119 for coacting with a rocker arm or member 120 rotatably mounted on the nozzle 93. The rocker arm 120 has an angular extension 121 held in engagement with the periphery of the cam 118 by the coaction of an opposed extension 122 and helical spring 123 which connects the latter extension to one of the posts 97 (FIG. 5), whereby said rocker arm is oscillated clockwise by the intermittent clockwise rotation of said cam with the shaft 112 and is urged counterclockwise by the force of the spring. An elongated, tubular boss 124 depends from the cover plate 83 in surrounding relation to its opening 92 and has a unidirectional clutch 125, similar to the clutch 111, confined on its lower portion (FIG. 4). The clutch 125 includes a pair of rotatable hubs 126 and 127 having adjacent recessed clutch faces 128 and 129 for receiving a helical spring 130, the upper hub being fixed to the rocker arm. An external, radial flange 131 is provided on the upper clutch hub 126 above its face 128 so as to underlie the rocker arm 120 and said hub is supported by the lower clutch hub 127 being rotatably confined on the boss 124 by an internal retainer ring 132. The lower clutch hub is angular in cross-section and, as shown at 133, has an internally-offset lower end underlying the lower end of the boss for confining an anti-friction, sealing washer therebetween.

The nozzle 93 includes a cylindrical tube 134 extending slidably and rotatably through the cover plate opening 92 and its surrounding boss 124 and having its lower end flared outwardly to provide an external, inclined flange 135 for underlying the complementary lower end surface of the lower clutch hub 127 to confine the nozzle against upward displacement. A friction ring 136 overlies the flange 135 for engaging the lower clutch hub to drivingly connect the tube 134 to said hub when the nozzle is lifted to its upper or opened position by the pressure of the water in the chamber 84. The weight of the nozzle is sufficient to lower it to its closed position, shown in broken lines in FIG. 4. A ring 137 is recessed in the upper end of the cover plate opening to seal off around the nozzle tube and prevent foreign matter from entering said opening as well as provide a bearing for said tube.

Above its flange 87, the body 80 is enlarged and has a cylindrical side wall 138 upstanding from the external periphery of said flange to provide a chamber 139 to accommodate a T 140 screwthreaded on the upper end of the tube 134 when the nozzle 93 is in its closed or lower position. A radial enlargement or flange 141 is formed on the upper end of the side wall 138 and has an internal, bevelled seat 142 for engagement by a complementary circular plate 143 which overlies and is secured to the T 140 by an axial screw 144. The nozzle T has a pair of upwardly inclined branches 145, in opposed relationship, with a long nipple 146 screwthreaded in one branch and a short nipple 147 screwthreaded in the other branch and projecting from the chamber 139 when the nozzle is in its upper or opened position.

As should be readily apparent, the intermittent clockwise rotation of the cam 118 with the shaft 112 oscillates the rocker arm 120 clockwise upon each revolution of said cam and this movement is transmitted by the clutch 125 to the nozzle 93. The upper clutch hub 126 turns with the rocker arm and the clockwise movement of said hub contracts the spring 130 into tight engagement with the clutch faces 128 and 129 whereby the lower clutch hub 127 is drivingly connected to said upper clutch hub. When the lobe 119 of the cam moves past the extension 121 of the rocker arm, the force of the spring 123 rotates said rocker arm and the upper clutch hub counterclockwise (FIG. 5) so as to expand the spring 130 out of tight engagement with the clutch faces to permit counterclockwise turning of said upper clutch hub relative to the lower clutch hub and prevent reverse rotation of the nozzle. Manifestly, one complete revolution of the nozzle 93 requires a large number of actuations of the rocker arm 120 by the cam 118 and the rotational speed of said nozzle is further reduced and the transmitted torque increased by the large number of actuations of the arm 110 by the cam 105 required to impart one full turn to said cam 118. As a result, the nozzle may turn very slowly and require a minimum input of power.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In combination with a lawn sprinkler having a chamber, a water inlet communicating with the chamber and a rotating nozzle communicating with the chamber, a torque transmission unit for imparting intermittent rotation to the nozzle including a stator-rotor type turbine mounted in the chamber between the nozzle and inlet, a rotatable cam driven by the turbine, a drive shaft in the chamber, arm means pivotally mounted in the chamber, means for biasing said arm means into engagement with the cam for oscillation upon rotation of said cam, unidirectional clutch means connecting the drive shaft and arm means for imparting intermittent rotation to said shaft upon oscillation of said arm means, and means for transmitting the intermittent rotation of said drive shaft to the nozzle, said arm means being oscillated one time upon each revolution of said cam whereby the unit has a high to low rotational speed reduction and a low to high torque transmission.

2. The combination set forth in claim 1 wherein the intermittent rotation transmitting means includes a pinion mounted on and rotatable with the drive shaft, and a gear meshing with the pinion and of larger diameter so as to rotate the nozzle at a slower rate of speed.

3. The combination set forth in claim 1 wherein the intermittent torque transmission means includes cam means mounted on said and rotatable with the drive shaft, a member pivotally mounted for oscillation about the axis of the rotating nozzle and biased into engagement with the cam means whereby the member is oscillated upon rotation of said cam means, and unidirectionl clutch means connecting said nozzle and member for imparting intermittent rotation to said nozzle upon oscillation of said member.

4. The combination set forth in claim 3 wherein the unidirectional clutch means includes a pair of clutch hubs rotatable about the axis of rotation of the rotating nozzle, one of the clutch hubs being fixed to the member for oscillation therewith, said clutch hubs having coacting peripheral faces, and a second helical spring surrounding the clutch faces for contraction into engagement therewith so as to connect said clutch faces upon oscillation of said member in one direction and for expansion to disconnect said faces upon oscillation of said member in the opposite direction so as to permit reverse oscillation of said member and the clutch hub fixed thereto relative to the other clutch hub.

5. The combination set forth in claim 1 wherein the turbine includes a stator, and a rotor rotatably mounted on the stator and having the cam mounted thereon for rotation therewith, said stator having openings for directing water entering the chamber against the rotor for driving the same.

6. The combination set forth in claim 1 wherein the unidirectional clutch includes a clutch hub rotatably mounted on the drive shaft and fixed to the element for oscillation therewith, the clutch hub and drive shaft having coacting peripheral clutch faces, and a helical spring surrounding the clutch faces for contraction into engagement therewith so as to connect said clutch faces upon oscillation of said clutch hub in one direction and for expansion to disconnect said faces upon oscillation of said hub in the opposite direction as to permit reverse rotation thereof, relative to said drive shaft.

7. The combination set forth in claim 6 including means rotatably supporting the drive shaft, the supporting means and shaft having coacting peripheral clutch faces, and a second helical spring surrounding the latter clutch faces and wound in a direction opposite to the winding of the spring surrounding the coacting clutch faces of the clutch hub and drive shaft whereby the second spring is expanded out of engagement with its clutch faces when the other spring is contracted to permit rotation of the drive shaft with said clutch hub relative to said supporting means and is contracted when said other spring is expanded to prevent reverse rotation of said drive shaft with said hub.

8. The combination set forth in claim 1 including at least a second torque transmission unit having second cam means mounted on and rotatable with the drive shaft, a member pivotally mounted for oscillation and biased into engagement with the second cam means whereby the member is oscillated upon rotation of said second cam means, rotatable means, and second unidirectional clutch means connecting the rotatable means and pivotally mounted member for imparting intermittent rotation to said rotatable means upon oscillation of said member, each revolution of said second cam means imparting one oscillation to said member to provide high to low rotational speed reduction and low to high torque transmission.

9. The combination set forth in claim 8 wherein the unidirectional clutch means of the second torque transmission unit includes a pair of clutch hubs rotatable about the axis of rotation of the rotatable means, one of the clutch hubs being fixed to the pivotally mounted member for oscillation therewith, said clutch hubs having coacting peripheral faces, and a second helical spring surrounding the latter clutch faces for contraction into engagement therewith so as to connect said clutch faces upon oscillation of said member in one direction and for expansion to disconnect said faces upon oscillation of said member in the opposite direction so as to permit reverse oscillation of said member and the clutch hub fixed thereto relative to the other clutch hub.

10. The combination set forth in claim 9 wherein the unidirectional clutch of the first torque transmission unit includes a clutch hub rotatably mounted on the drive shaft and fixed to the element pivotally mounted for oscillation about said shaft for oscillation with said element, the clutch hub and drive shaft having coacting peripheral clutch faces, and a helical spring surrounding the clutch faces for contraction into engagement therewith so as to connect said clutch faces upon oscillation of said clutch hub of said first unit in one direction and for expansion to disconnect said faces upon oscillation of said hub in the opposite direction so as to permit reverse rotation thereof relative to said drive shaft.

11. The combination set forth in claim 10 including means rotatably supporting the drive shaft, the supporting means and shaft having coacting peripheral clutch faces, and a second helical spring surrounding the latter clutch faces and wound in a direction opposite to the winding of the spring surrounding the coacting clutch faces of the clutch hub of the first torque transmission unit and drive shaft whereby the second spring is expanded out of engagement with the clutch faces when the other spring is contracted to permit rotation of the drive shaft with said clutch hub relative to said supporting means and is contracted when said other spring is expanded to prevent reverse rotation of said drive shaft with said hub.

12. The combination set forth in claim 8 wherein the unidirectional clutch of the first torque transmission unit includes a clutch hub rotatably mounted on the drive shaft and fixed to the element pivotally mounted on said shaft for oscillation with said element, the clutch hub of said first unit and drive shaft having coacting peripheral clutch faces, and a helical spring surrounding the clutch faces for contraction into engagement therewith so as to connect said clutch faces upon oscillation of said clutch hub in one direction and for expansion to disconnect said faces upon oscillation of said hub in the opposite direction so as to permit reverse rotation thereof relative to said drive shaft.

13. The combination set forth in claim 12 including means rotatably supporting the drive shaft, the supporting means and shaft having coacting peripheral clutch faces, and a second helical spring surrounding the latter clutch faces and wound in a direction opposite to the winding of the spring surrounding the coacting clutch faces of the clutch hub of the first torque transmission unit and drive shaft whereby the second spring is expanded out of engagement with its clutch faces when the other spring is contracted to permit rotation of the drive shaft with said clutch hub relative to said supporting means and is contracted when said other spring is expanded to prevent reverse rotation of said drive shaft with said hub.

14. The combination set forth in claim 8 wherein the turbine includes a stator plate, and a rotor plate rotatably mounted on the stator plate and having the second cam means mounted thereon for rotation therewith, said stator plate having openings for directing fluid under pressure against the rotor plate for driving the same.

References Cited by the Examiner

UNITED STATES PATENTS

| | | | |
|---|---|---|---|
| Re. 23,646 | 4/1953 | Burdick | 239—205 |
| 2,575,012 | 11/1951 | Harvey | 192—12 |
| 2,885,896 | 5/1959 | Hungerford | 192—12 X |
| 2,979,271 | 4/1961 | Boyden | 239—241 |
| 3,038,666 | 6/1962 | Dudley | 239—241 |
| 3,088,677 | 5/1963 | Coffey | 239—205 |
| 3,099,164 | 7/1963 | Geiger | 74—125 |
| 3,144,779 | 8/1964 | Linn | 74—125 |

FOREIGN PATENTS 289,843   6/1928   Great Britain.

M. HENSON WOOD, Jr., *Primary Examiner.*

EVERETT W. KIRBY, *Examiner.*

D. L. MOSELEY, *Assistant Examiner.*